(12) United States Patent
Takasaka et al.

(10) Patent No.: US 12,738,707 B2
(45) Date of Patent: Sep. 15, 2026

(54) OPTICAL AMPLIFYING FIBER, OPTICAL FIBER AMPLIFIER, AND OPTICAL COMMUNICATION SYSTEM

(71) Applicant: FURUKAWA ELECTRIC CO., LTD., Tokyo (JP)

(72) Inventors: Shigehiro Takasaka, Tokyo (JP); Koichi Maeda, Tokyo (JP); Keiichi Aiso, Tokyo (JP); Shinichi Arai, Tokyo (JP); Ryuichi Sugizaki, Tokyo (JP); Kazunori Mukasa, Tokyo (JP); Yukihiro Tsuchida, Tokyo (JP); Masanori Takahashi, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 1039 days.

(21) Appl. No.: 17/931,264

(22) Filed: Sep. 12, 2022

(65) Prior Publication Data

US 2023/0006410 A1 Jan. 5, 2023

Related U.S. Application Data

(63) Continuation of application No. PCT/JP2021/010923, filed on Mar. 17, 2021.

(30) Foreign Application Priority Data

Mar. 24, 2020 (JP) ................................. 2020-052514
Aug. 17, 2020 (JP) ................................. 2020-137386

(51) Int. Cl.
*H01S 3/067* (2006.01)
*G02B 6/02* (2006.01)
(Continued)

(52) U.S. Cl.
CPC ...... *H01S 3/06733* (2013.01); *G02B 6/02042* (2013.01); *G02B 6/02295* (2013.01);
(Continued)

(58) Field of Classification Search
CPC ........................ G02B 6/02342; G02B 6/02347
See application file for complete search history.

(56) References Cited

U.S. PATENT DOCUMENTS 5,867,305 A * 2/1999 Waarts ................ H01S 3/06758 372/6
6,496,634 B1 12/2002 Levenson
(Continued)

FOREIGN PATENT DOCUMENTS

CN 1564035 A 1/2005
CN 102782537 A 11/2012
(Continued)

OTHER PUBLICATIONS https://www.merriam-webster.com/dictionary/toric, downloaded Nov. 6, 2025 (Year: 2025).*
(Continued)

*Primary Examiner* — Eric L Bolda
(74) *Attorney, Agent, or Firm* — Oblon, McClelland, Maier & Neustadt, L.L.P.

(57) ABSTRACT

An optical amplifying fiber includes: at least one single core portion doped with a rare-earth element; an inner cladding portion configured to enclose the at least one core portion, the inner cladding portion having a lower refractive index than maximum refractive index of each core portion; and an outer cladding portion configured to enclose the inner cladding portion, the outer cladding portion having a lower refractive index than refractive index of the inner cladding portion, wherein the inner cladding portion includes a plurality of air bubbles.

19 Claims, 11 Drawing Sheets

(51) Int. Cl.
*H01S 3/091* (2006.01)
*H01S 3/16* (2006.01)

(52) U.S. Cl.
CPC .......... *H01S 3/06729* (2013.01); *H01S 3/091* (2013.01); *H01S 3/1698* (2013.01); *G02B 6/02357* (2013.01)

(56) References Cited

U.S. PATENT DOCUMENTS

| | | | |
|---|---|---|---|
| 2004/0069019 A1 | 4/2004 | Carter et al. | |
| 2005/0094954 A1* | 5/2005 | Pickrell | C03C 13/04 385/12 |
| 2008/0181567 A1 | 7/2008 | Bookbinder et al. | |
| 2009/0324242 A1 | 12/2009 | Imamura | |
| 2010/0067860 A1 | 3/2010 | Ikeda et al. | |
| 2013/0064543 A1 | 3/2013 | Imamura | |
| 2015/0188634 A1 | 7/2015 | Imamura | |
| 2015/0316714 A1 | 11/2015 | Tsuchida et al. | |
| 2019/0094458 A1 | 3/2019 | Ohara | |
| 2020/0012042 A1* | 1/2020 | Arai | G02B 6/02242 |

FOREIGN PATENT DOCUMENTS

| | | | |
|---|---|---|---|
| EP | 2 722 943 | A1 | 4/2014 |
| JP | 2010-517112 | A | 5/2010 |
| JP | 2011-145520 | A | 7/2011 |
| JP | 2017-183564 | A | 10/2017 |
| JP | 2018-100206 | A | 6/2018 |
| WO | WO 2008/133242 | A1 | 11/2008 |
| WO | WO 2009/107414 | A1 | 9/2009 |
| WO | WO 2012/172997 | A1 | 12/2012 |
| WO | WO 2017/203698 | A1 | 11/2017 |

OTHER PUBLICATIONS

International Search Report issued May 18, 2021 in PCT/JP2021/010923, 2 pages.

Abedin et al, "Multimode Erbium Doped Fiber Amplifiers for Space Division Multiplexing Systems", Journal of Lightwave Technology, vol. 32, No. 16, Aug. 15, 2014, 9 Pages.

Abedin et al, "Cladding-Pumped Erbium-doped Multicore Fiber Amplifier", Optics Express vol. 20, No. 18, Aug. 27, 2012, 10 Pages.

Sakamoto et al., "Crosstalk Suppressed Hole- Assisted 6-core Fiber with Cladding Diameter of 125 um", 39th European Conference and Exhibition on Optical Communication (ECOC 2013), IEEE, Oct. 28, 2013, 3 Pages.

Goto et al., "Impact of Air Hole on Crosstalk Suppression and Spatial Core Density of Multi-Core Fiber", Journal of Lightwave Technology, vol. 36, No. 20, Oct. 15, 2018, 7 Pages.

Nakazawa, "Evolution of EDFA from Single-Core to Multi-Core and Related Recent Progress in Optical Communication", Optical Review, vol. 21, No. 6, Nov. 27, 2014, 24 Pages.

Samir et al., "Stack-and-Draw Manufacture Process of a Seven-Core Optical Fiber for Fluorescence Measurements", Fiber and Integrated Optics, vol. 37, Dec. 13, 2017 11 Pages.

Combined Chinese Office Action issued Jul. 30, 2025 in Chinese Patent Application No. 202180022880.0 (with English Translation of Office Action only), 16 pages.

Japanese Office Action Issued Jul. 2, 2024 in Japanese Patent Application No. 2020-137386 (with unedited machine-generated English translation), 23 pages.

* cited by examiner 100
170
160
150
1
140
130
120
110

OPTICAL AMPLIFYING FIBER, OPTICAL FIBER AMPLIFIER, AND OPTICAL COMMUNICATION SYSTEM

This application is a continuation of International Application No. PCT/JP2021/010923, filed on Mar. 17, 2021 which claims the benefit of priority of the prior Japanese Patent Application No. 2020-052514, filed on Mar. 24, 2020, and Japanese Patent Application No. 2020-137386, filed on Aug. 17, 2020, the entire contents of which are incorporated herein by reference.

BACKGROUND

The present disclosure is related to an optical amplifying fiber, an optical fiber amplifier, and an optical communication system.

For example, in the application of undersea optical communication, as a result of using multicore EDFAs (Erbium-Doped optical Fiber Amplifiers) as optical amplifiers, it is expected to have reduction in the power consumption of the optical amplifiers.

Regarding a multicore EDFA, a configuration is known in which a double-clad multicore EDF is used as a multicore optical amplifying fiber, and a clad excitation method is implemented for causing optical excitation of erbium (Er) that is a rare-earth element present in the core portions (refer to Kazi S Abedin et al, "Multimode Erbium Doped Fiber Amplifiers for Space Division Multiplexing Systems", JOURNAL OF LIGHTWAVE TECHNOLOGY, VOL. 32, NO. 16, Aug. 15, 2014 pp. 2800-2808, and Kazi S Abedin et al, "Cladding-pumped erbium-doped multicore fiber amplifier", OPTICS EXPRESS Vol. 20, No. 18 27 Aug. 2012 pp. 20191-20200).

SUMMARY

Since the communication traffic is constantly on the rise, with the aim of achieving an increase in the communication capacity, there is a demand for multicore optical fiber amplifiers having more favorable characteristics.

Particularly, if the excitation efficiency of a multicore optical amplifying fiber may be improved, it is a desirable improvement from the perspective of achieving reduction in the power consumption of the multicore optical amplifying fiber. The excitation efficiency is expressed as the ratio of the energy of the pumping light used in optical amplification with respect to the energy of the pumping light input to the multicore optical amplifying fiber. Meanwhile, the improvement in the excitation efficiency is not only valuable in multicore optical amplifying fibers, but is also valuable in single-core optical amplifying fibers.

There is a need for an optical amplifying fiber having improved excitation efficiency, and to provide an optical fiber amplifier and an optical communication system in which that optical amplifying fiber is used.

According to one aspect of the present disclosure, there is provided an optical amplifying fiber including: at least one single core portion doped with a rare-earth element; an inner cladding portion configured to enclose the at least one core portion, the inner cladding portion having a lower refractive index than maximum refractive index of each core portion; and an outer cladding portion configured to enclose the inner cladding portion, the outer cladding portion having a lower refractive index than refractive index of the inner cladding portion, wherein the inner cladding portion includes a plurality of air bubbles.

DETAILED DESCRIPTION

Figure 1:
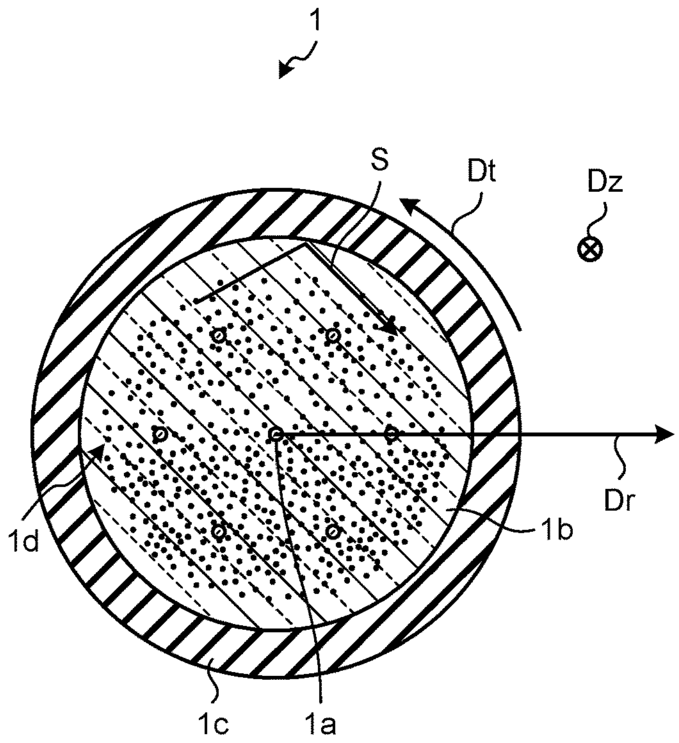
FIG. 1 is a schematic cross-sectional view of a multicore optical amplifying fiber according to a first embodiment.

Exemplary embodiments are described below with reference to the accompanying drawings. However, the present disclosure is not limited by the embodiments described below. In the drawings, identical elements or corresponding elements are referred to by the same reference numerals. Moreover, each drawing is schematic in nature, and it needs to be kept in mind that the relationships among the dimensions of the elements or the ratio of the elements may be different than the actual situation. Among the drawings, there may be portions having different relationships among the dimensions or having different ratios. Furthermore, in the present written description, the cutoff wavelength implies the cable cutoff wavelength defined in ITU-T (International Telecommunications Union) G.650.1. Moreover, regarding the terms not particularly defined, the definitions and the measurement methods given in G.650.1 and G.650.2 are followed.

FIG. 1 is a schematic cross-sectional view of a multicore optical amplifying fiber according to a first embodiment, and illustrates a cross-sectional surface of the multicore optical amplifying fiber in a perpendicular direction to an axial direction. A multicore optical amplifying fiber 1 is a double-clad seven-core-type optical fiber that includes the following constituent elements: seven core portions 1*a* representing a plurality of core portions; an inner cladding portion 1*b* that encloses the core portions 1*a*; and an outer cladding portion 1*c* that encloses the inner cladding portion 1*b*.

Herein, the direction vertical to the plane of FIG. 1 represents an axial direction Dz of the multicore optical amplifying fiber 1. Moreover, in FIG. 1, a radial direction Dr and an axial-rotation direction Dt of the multicore optical amplifying fiber 1 are defined. In the other drawings too, in an identical manner to FIG. 1, the axial direction Dz, the radial direction Dr, and the axial-rotation direction Dt may be defined in the same manner.

The core portions 1*a* are placed in a triangular lattice in such a way that a close-packed state is achieved. That is, a single core portion 1*a* is placed at or close to the center of the inner cladding portion 1*b*. Centering around that core portion 1*a*, six core portions 1*a* are placed to represent the corners of a regular hexagon. Thus, it may also be said that, when a hexagonal close-packed lattice is defined in the cross-sectional surface perpendicular to an axial direction of the multicore optical amplifying fiber 1, the core portions 1*a* are positioned at the lattice points. The core portions 1*a* include, for example germanium (Ge) or aluminum (Al) as the refractive index adjustment dopant meant for enhancing the refractive index. Moreover, the core portions 1*a* include erbium (Er) that is a rare-earth element serving as an amplification medium. Herein, Er is added at such a concentration that, for example, the absorption coefficient near the wavelength of 1530 nm is in the range of 2.5 dB/m to 11 dB/m. The addition concentration is, for example, in the range of 250 ppm to 2000 ppm. However, there is no particular restriction on the absorption coefficient or the addition concentration. Meanwhile, Al also has the function of suppressing the concentration quenching of Er.

The inner cladding portion 1*b* has a lower refractive index than the maximum refractive index of the core portions 1*a*. The inner cladding portion 1*b* is made of, for example, pure silica glass without having any refractive index adjustment dopant added thereto. As a result, a step-index-type refractive index profile is achieved between the core portions 1*a* and the inner cladding portion 1*b*. Meanwhile, in the inner cladding portion 1*b*, a trench portion may be formed on the outer periphery of each core portion 1*a*. In that case, the trench portions are made of silica glass in which a refractive index adjustment dopant such as fluorine (F) is added for lowering the refractive index. Thus, the trench portions have a lower refractive index than the refractive index of the remaining portion of the inner cladding portion 1*b* that is made of pure silica glass. In that case, a trench-type refractive index profile is achieved between the core portion 1*a* and the inner cladding portion 1*b*.

If core Δ represents the relative refractive-index difference of each core portion 1*a* with respect to the glass of the inner cladding portion 1*b*; then, in the first embodiment, core Δ of each core portion 1*a* is substantially identical and, for example, is in the range between 0.35% and 2% at the wavelength of 1550 nm. In relationship to core Δ, it is desirable that the core diameter of the core portions 1*a* is set to achieve a cutoff wavelength that is shorter than the optical amplification waveband at which a rare-earth element is capable of optical amplification. In the case of Er, the optical amplification waveband is, for example, in the range between 1530 nm to 1565 nm called the C band or in the range between 1565 nm to 1625 nm called the L band. The core diameter is, for example, in the approximate range between 5 μm and 10 μm.

The outer cladding portion 1*c* has a lower refractive index than the refractive index of the inner cladding portion 1*b*, and is made of resin, for example. If the inner cladding portion 1*b* includes trench portions, then the outer cladding portion 1*c* may have a higher refractive index than the refractive index of the trench portions. However, the refractive index of the outer cladding portion 1*c* is lower than the refractive index of the remaining portion of the inner cladding portion 1*b* and is lower than the average refractive index of the inner cladding portion 1*b*.

In the inner cladding portion 1*b* of the multicore optical amplifying fiber 1, a plurality of air bubbles 1*d* is formed. The air bubbles id are independent air bubbles and, for example, include a gas having a lower pressure than the atmospheric pressure.

In the inner cladding portion 1*b*, when a pumping light having the wavelength capable of causing optical excitation of Er, such as a pumping light having the wavelength of, for example, 976 nm in the wavelength range of 900 nm, is input; the pumping light propagates through the inside of the inner cladding portion 1*b* and causes optical excitation of Er added in the core portions 1*a*. As a result, the core portions 1*a* become capable of optical amplification of the signal light input thereto. In this way, the multicore optical amplifying fiber 1 is configured to enable implementation of the clad excitation method.

In the multicore optical amplifying fiber 1, the air bubbles 1*d* cause scattering of the pumping light propagating through the inner cladding portion 1*b*. As a result, of the pumping light propagating through the inner cladding portion 1*b*, a large amount of optic components reach the core portions 1*a*. For example, in the case of the clad excitation method as implemented in the multicore optical amplifying fiber 1, usually there are unused optic components that are not involved in optical excitation, such as skew components S that propagate in a way of not reaching the core portions 1*a*. However, in the multicore optical amplifying fiber 1, the unused optic components such as the skew components S get scattered due to the air bubbles 1*d* and partially reach the core portions 1*a*. Hence, they may become useful in the optical excitation of Er. Meanwhile, since the pumping light propagates through the inner cladding portion 1*b* in the multimode manner, there may also be a mode in which the skew components S too propagate at various angles. As a result of getting scattered due to the air bubbles 1*d*, the various skew components S may partially reach the core portions 1*a* and may become more available for use in the optical excitation of Er.

In the multicore optical amplifying fiber 1, the air bubbles 1*d* are not present in the region near the boundary between the inner cladding portion 1*b* and the outer cladding portion 1*c*. As a result, the scattering of the skew components S gets moderately adjusted, thereby making it possible to hold down the generation of scattering light that travels in the direction away from the core portions 1*a* in the region near the boundary between the inner cladding portion 1*b* and the outer cladding portion 1*c*.

In the multicore optical amplifying fiber 1 configured in the manner explained above, since the air bubbles 1*d* cause scattering of the pumping light propagating through the inner cladding portion 1*b*, a large amount of the optic components of the pumping light reach the core portion 1*a*. As a result, improvement is achieved in the excitation efficiency.

In the multicore optical amplifying fiber 1, in the cross-sectional surface orthogonal to the axial direction Dz illustrated in FIG. 1, if the sum total of the cross-sectional areas of the air bubbles 1*d* with respect to the cross-sectional area of the inner cladding portion 1*b* is treated as the cross-sectional ratio, then it is desirable to have the cross-sectional ratio to be equal to or greater than 0.1% and equal to or smaller than 30%, and it is more desirable to have the cross-sectional ratio to be equal to or greater than 1%. If the cross-sectional ratio is equal to or greater than 0.1%, then the improvement in the excitation efficiency attributed to the air bubbles 1*d* is elicited with ease. If the cross-sectional ratio is equal to or greater than 1%, then the improvement is elicited with more ease. Moreover, if the cross-sectional ratio is equal to or smaller than 30%, then the multicore optical amplifying fiber 1 having the desired optical characteristics (such as the amplification characteristics) may be manufactured with ease. However, if the cross-sectional ratio is greater than 30%, then the effect of scattering of the pumping light becomes too intense, thereby sometimes resulting in an increase in the propagation loss of the pumping light in the inner cladding portion 1*b*. In that case, the improvement in the excitation efficiency, which is attributed to the scattering of the pumping light because of the air bubbles, is eclipsed by the deterioration in the excitation efficiency due to an increase in the propagation loss.

Meanwhile, in the cross-sectional surface as illustrated in FIG. 1, it is desirable that the diameter of the air bubbles 1*d* is equal to or greater than 1/2000 times and equal to or smaller than double the wavelength of the light (pumping light) propagating through the inner cladding portion 1*b*. When the air bubbles 1*d*, which represent scatterers, have the diameter to be equal to or greater than 1/2000 times and equal to or smaller than double the wavelength of the pumping light; the scattering of light due to the air bubbles 1*d* is mainly Mie scattering. When the air bubbles 1*d* have the diameter to be equal to or greater than 1/2000 times and equal to or smaller than 1/20 times the wavelength of the pumping light, the scattering of light due to the air bubbles 1*d* is mainly Rayleigh scattering. In this way, when there is collision of optical waves due to a granular material or due to refractive-index variation, the type of scattering changes according to the magnitude of collision. In Mie scattering, forward scattering occurs primarily. On the other hand, in Rayleigh scattering, isotropic scattering occurs. It is believed that both types of scattering contribute in the improvement of the excitation efficiency. For example, using the characteristics of the scattering direction of such types of scattering, according to the placement of the core portions 1*a* or according to the electrical field distribution of the pumping light in the inner cladding portion 1*b*, the air bubbles 1*d* having different diameters may be spatially distributed and the degree of improvement in the excitation efficiency may be enhanced. For example, when it is effective to significantly vary the propagation direction, Rayleigh scattering plays a major role in improving the excitation efficiency. Regarding a method for controlling the diameter of the air bubbles 1*d*, the detailed explanation is given later.

Meanwhile, if the cross-sectional surface of the air bubbles 1*d* is not circular, then the diameter thereof may be defined as the diameter of a circle having the same cross-sectional area as the air bubbles 1*d*.

Moreover, it is desirable that the air bubbles 1*d* are present inside the inner cladding portion 1*b* in a random manner. Consequently, the pumping light scattering effect is exerted uniformly with ease with respect to each core portion 1*a*. Herein, having the air bubbles 1*d* formed inside the inner cladding portion 1*b* in a random manner may be rephrased as having no bias in the distribution of the air bubbles 1*d* inside the inner cladding portion 1*b*, or having a substantially uniform distribution of the air bubbles 1*d* inside the inner cladding portion 1*b*. Thus, for example, it is desirable that the air bubbles 1*d* have a substantially uniform distribution in the axial direction Dz.

Figure 2:
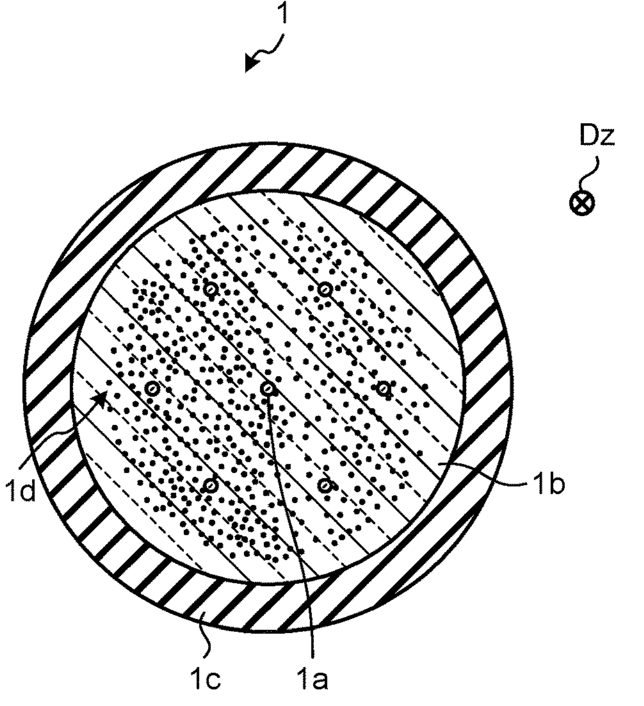
FIG. 2 is a schematic cross-sectional view of the multicore optical amplifying fiber, which is illustrated in FIG. 1, in a different cross-sectional surface than the cross-sectional surface illustrated in FIG. 1.

FIG. 2 is a schematic cross-sectional view of the multicore optical amplifying fiber 1, which is illustrated in FIG. 1, in a different cross-sectional surface than the cross-sectional surface illustrated in FIG. 1. With reference to the cross-sectional surface illustrated in FIG. 1, the cross-sectional surface illustrated in FIG. 2 is separated by about 1% to 5% of the length of the multicore optical amplifying fiber 1, that is, separated only by a small distance against the length of the multicore optical amplifying fiber 1. In the cross-sectional surface illustrated in FIG. 2, just by a small shift in the axial direction, the air bubbles 1*d* are formed at different positions as compared to the cross-sectional surface illustrated in FIG. 1. In this way, the positions of the air bubbles 1*d* may be different in each cross-sectional surface.

In an identical manner, it is desirable that the air bubbles 1*d* have a substantially uniform distribution in the radial direction Dr. Moreover, it is desirable that the air bubbles 1*d* have a substantially uniform distribution in the radial direction of the core portions 1*a*. Furthermore, it is desirable that the air bubbles 1*d* have a substantially uniform distribution in the axial-rotation direction Dt. In that case, in the axial-rotation direction Dt, the positions of the air bubbles 1*d* within the range between 0° to 60° from the reference angle position may be different than the positions of the air bubbles 1*d* within the range between 60° to 120° from the reference angle position. Moreover, it is also desirable that the air bubbles 1*d* have a substantially uniform distribution in the axial-rotation direction of the core portions 1*a*.

The multicore optical amplifying fiber 1 may be manufactured according to a known multicore fiber manufacturing method such as the stacking method or the hole drilling method. The air bubbles 1*d* may be formed, for example, inside the inner cladding portion 1*b* according to a known method such as the method of using particles as disclosed in Japanese Patent Application Laid-open No. 2018-162170.

In the method of using particles, for example, a mixture of crystal quartz particles and silica glass particles may be used. In that case, a gas such as helium having a higher solid solubility in the crystal quartz particles as compared to its solid solubility in the silica glass particles may be dissolved in the crystal quartz particles. As a result, when the crystal quartz particles melt due to heat treatment, the helium gas releases bubbles. Hence, the air bubbles 1*d* get formed inside the inner cladding portion 1*b*.

Figure 3:
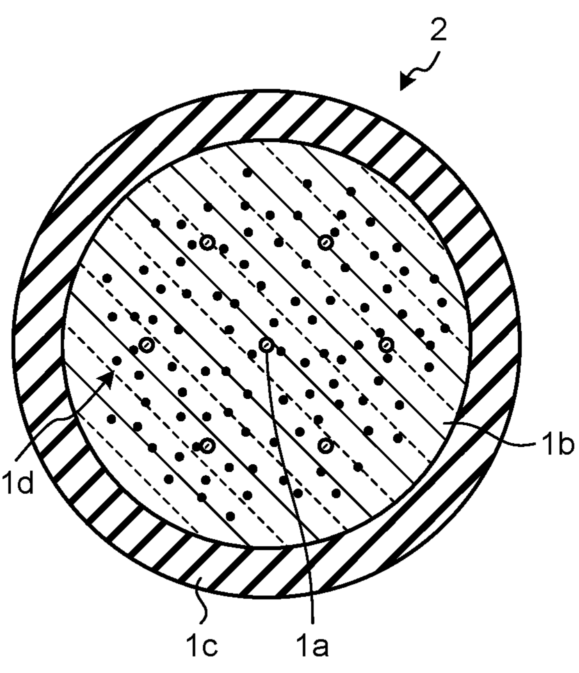
FIG. 3 is a schematic cross-sectional view of a multicore optical amplifying fiber according to a second embodiment.

FIG. 3 is a schematic cross-sectional view of a multicore optical amplifying fiber according to a second embodiment, and illustrates a cross-sectional surface of the multicore optical amplifying fiber in a perpendicular direction to an axial direction. As compared to the multicore optical amplifying fiber 1 according to the first embodiment, in a multicore optical amplifying fiber 2, the air bubbles 1*d* inside the inner cladding portion 1*b* have a lower density and a smaller cross-sectional ratio.

In the multicore optical amplifying fiber 2 configured in the manner explained above, in an identical manner to the multicore optical amplifying fiber 1, improvement is achieved in the excitation efficiency.

Figure 4:
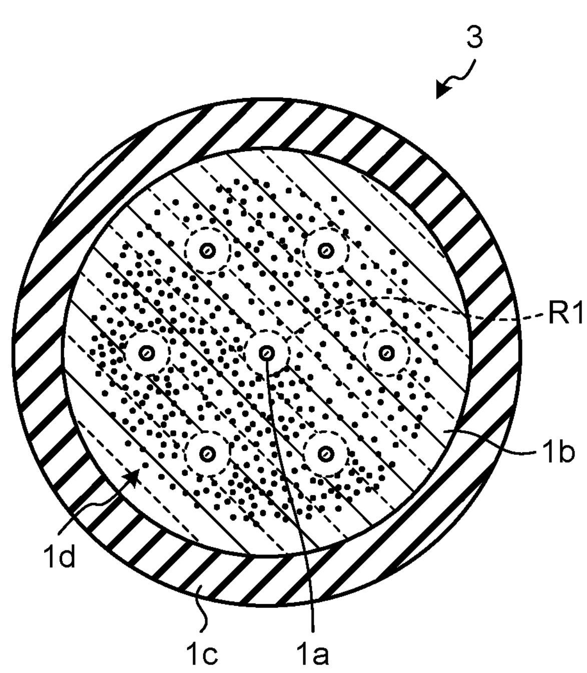
FIG. 4 is a schematic cross-sectional surface of a multicore optical amplifying fiber according to a third embodiment.

FIG. 4 is a schematic cross-sectional surface of a multicore optical amplifying fiber according to a third embodiment, and illustrates a cross-sectional surface of the multicore optical amplifying fiber in a perpendicular direction to an axial direction. As compared to the multicore optical amplifying fiber 1 according to the first embodiment, in a multicore optical amplifying fiber 3, each core portion 1*a* in the inner classing portion 1*b* is enclosed by a region R1.

Each region R1 is formed in a concentric manner with respect to the corresponding core portion 1*a*; has the diameter, for example, equal to or greater than triple the core diameter of the corresponding core portion 1*a*; and has a circular tube shape extending in the axial direction Dz along the corresponding core portion 1*a*. Moreover, the regions R1 do not include the air bubbles 1*d*.

In the multicore optical amplifying fiber 3 configured in the manner explained above, in the cross-sectional surface orthogonal to the axial direction Dz of the multicore optical amplifying fiber 3, the air bubbles 1*d* are separated from the core portions 1*a* by a distance equal to or greater than the core diameter, such as by a distance equal to or greater than triple the core diameter. As a result, in the multicore optical amplifying fiber 3, in an identical manner to the multicore optical amplifying fibers 1 and 2, improvement is achieved in the excitation efficiency. Moreover, it also becomes possible to hold down the occurrence of a situation in which the pumping light that has been scattered once due to the air bubbles 1*d* and that is heading toward the core portions 1*a* gets re-scattered due to the air bubbles present close to the core portions 1*a*. Furthermore, since the air bubbles 1*d* are relatively separated from the core portions 1*a*, it becomes possible to curb the impact of the air bubbles 1*d* on the light propagation characteristics of the core portions 1*a*.

The multicore optical amplifying fiber 3 may be manufactured according to a known multicore fiber manufacturing method. For example, in the case of implementing the stacking method, seven core rods that are glass rods, each of which includes a portion representing the core portion 1*a* and a portion representing the region R1, are stacked in a glass tube representing a part of the inner cladding portion 1*b*. Then, in the gap present between the core rods and the glass tube, glass rods representing a part of the inner cladding portion 1*b* are stacked to enable easy formation of air bubbles on the inside and on the outer periphery after the optical fiber drawing process; and a base material is formed. Subsequently, optical fiber drawing of the base material is performed, and the outer cladding portion 1*c* is formed. In the case of implementing the hole drilling method, seven holes extending in parallel in an axial direction are formed on a base material rod that is a glass rod representing a part of the inner cladding portion 1*b*, that has a relatively large diameter, and that enables easy formation of air bubbles on the inside and on the outer periphery after the optical fiber drawing process. Then, a core rod is inserted in each hole, and a base material is formed. Subsequently, optical fiber drawing of the base material is performed, and the outer cladding portion 1*c* is formed. A glass rod that enables easy formation of air bubbles on the inside and on the outer periphery after the optical fiber drawing process implies, for example, one of the following: a glass rod that, depending on the roughness of its surface, may control the density and the bubble diameter of the air bubbles; a glass rod including a plurality of additives at a percentage adjusted to ensure that the refractive index of the glass rod is lower than the refractive index of the core portion; and a glass rod including a plurality of additives that have a different viscosity in the optical fiber drawing furnace than the surrounding glass material and that are added at a percentage adjusted to ensure that the refractive index of the glass rod is lower than the refractive index of the core portion. Herein, the additives imply substances such as Ge, Al, F, boron (B), lanthanum (La), and chlorine (Cl) that may be used as optical fiber additives.

Figure 5:
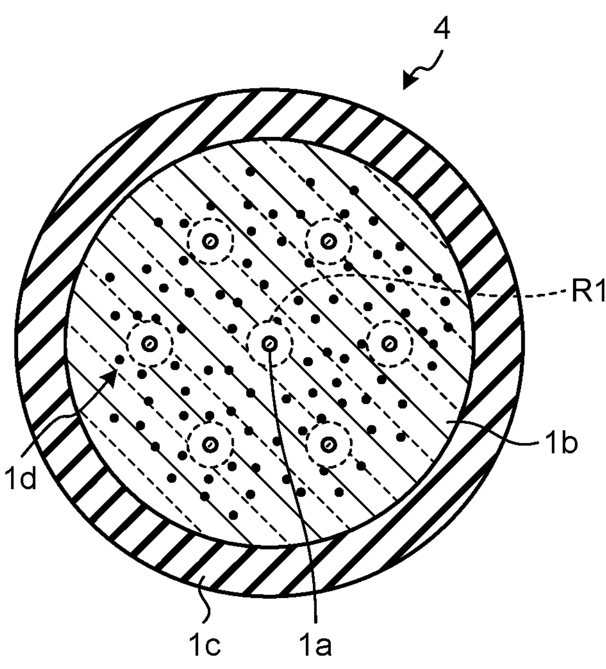
FIG. 5 is a schematic cross-sectional surface of a multicore optical amplifying fiber according to a fourth embodiment.

FIG. 5 is a schematic cross-sectional surface of a multicore optical amplifying fiber according to a fourth embodiment, and illustrates a cross-sectional surface of the multicore optical amplifying fiber in a perpendicular direction to an axial direction. As compared to the multicore optical amplifying fiber 3 according to the third embodiment, in a multicore optical amplifying fiber 4, the air bubbles 1*d* inside the inner cladding portion 1*b* have a lower density and a smaller cross-sectional ratio.

In the multicore optical amplifying fiber 4 configured in the manner explained above, in an identical manner to the multicore optical amplifying fiber 3, improvement is achieved in the excitation efficiency. Moreover, it becomes possible to hold down re-scattering of the pumping light and to curb the impact of the air bubbles 1*d* on the light propagation characteristics of the core portions 1*a*.

Figure 6:
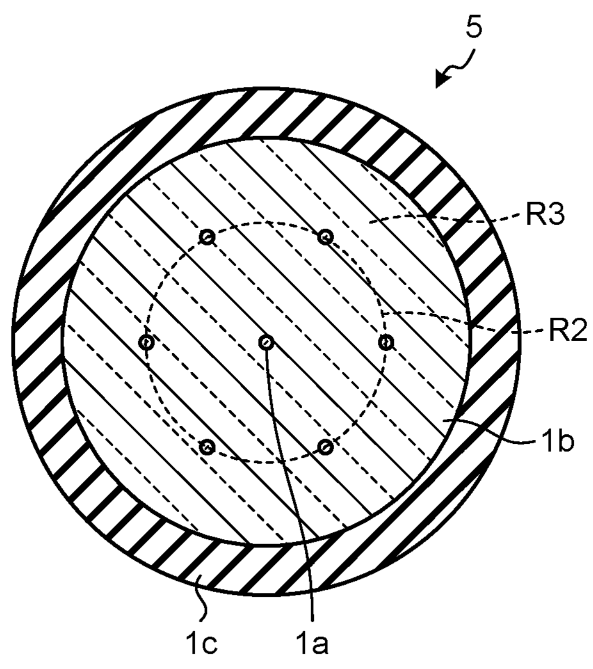
FIG. 6 is a schematic cross-sectional surface of a multicore optical amplifying fiber according to a fifth embodiment.

FIG. 6 is a schematic cross-sectional surface of a multicore optical amplifying fiber according to a fifth embodiment, and illustrates a cross-sectional surface of the multicore optical amplifying fiber in a perpendicular direction to an axial direction. As compared to the multicore optical amplifying fiber 1 according to the first embodiment, a multicore optical amplifying fiber 5 differs in the way that regions R2 and R3 are present in the inner cladding portion 1*b*. Meanwhile, in FIG. 6, air bubbles are not illustrated.

In the inner cladding portion 1*b*, the region R2 has a circular tube shape extending in the axial direction Dz and passes through the centers of the six core portions 1*a* that are placed to represent the corners of a regular hexagon. Moreover, in the inner cladding portion 1*b*, the region R3 has a circular tube shape extending in the axial direction Dz and is positioned on the outer periphery side of the region R2. The boundary between the regions R2 and R3 represents an example of the boundary that has a circular tube shape passing through the core portions 1*a* which are most separated from the center of the multicore optical amplifying fiber 5. The boundary is centered around the center of the multicore optical amplifying fiber 5.

In the multicore optical amplifying fiber 5, the density of the air bubbles 1*d* is different in the region R2 present on the inside of the boundary than in the region R3 present on the outside of the boundary. For example, the density of the air bubbles 1*d* is higher in the region R2 than in the region R3. Alternatively, for example, the density of the air bubbles 1*d* is lower in the region R2 than in the region R3.

In the multicore optical amplifying fiber 5 configured in the manner explained above, in an identical manner to the multicore optical amplifying fiber 1, improvement is achieved in the excitation efficiency. Moreover, in the multicore optical amplifying fiber 5, the extent of generation of the scattering light may be varied in the region R2 in which the core portions 1*a* are mainly present, as compared to the region R3 in which the skew components are relatively greater in number at the outer edge of the inner cladding portion 1*b*. For example, the density of the air bubbles may be increased in the region R2, so that a large amount of scattering light is generated in the region R2 in which the core portions 1*a* are mainly present. Alternatively, the density of the air bubbles may be increased in the region R3, so that a large amount of scattering of the skew components occurs. The design regarding the density of air bubbles in each region may be appropriately set according to the design and the prescribed properties of the multicore optical amplifying fiber 5.

The multicore optical amplifying fiber 5 may be manufactured according to a known multicore fiber manufacturing method. For example, in the case of implementing the hole drilling method, a base material rod representing a part of the inner cladding portion 1*b* is formed in such a way that the density of the air bubbles differs according to the position. Such a base material rod may be manufactured according to, for example, the jacketing method. Subsequently, seven holes are formed that extend in parallel in an axial direction; and, in each hole, a core rod is inserted that includes a portion representing the core portion 1*a* and a portion representing a part of the inner cladding portion 1*b*. Consequently, a base material is formed. Then, optical fiber drawing of the base material is performed, and the outer cladding portion 1*c* is formed. In the case of implementing the stacking method, the core rods are stacked inside a glass tube that represents a part of the inner cladding portion 1*b*. Subsequently, in the gap present between the core rods and the glass tube, glass rods representing a part of the inner cladding portion 1*b* are stacked to enable easy formation of air bubbles on the inside and on the outer periphery after the optical fiber drawing process; and a base material is formed. At that time, as a result of using a glass rod because of which the density of the air bubbles changes according to the stacking position, the density of the air bubbles may be varied depending on the position.

Figure 7:
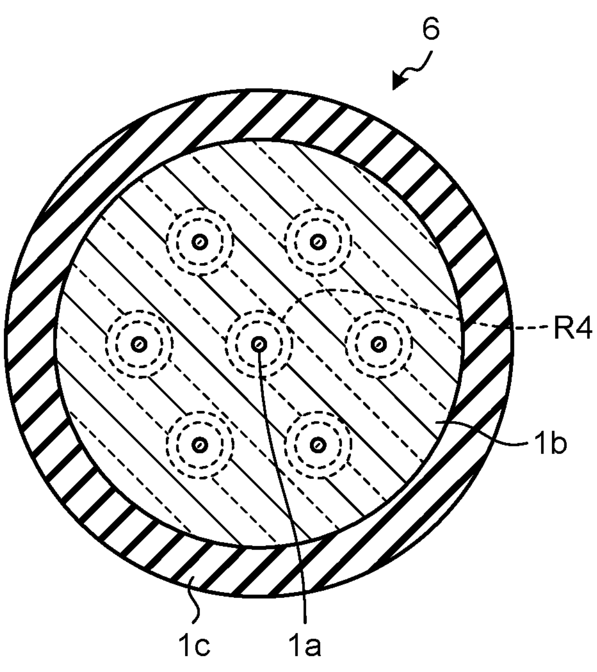
FIG. 7 is a schematic cross-sectional surface of a multicore optical amplifying fiber according to a sixth embodiment.

FIG. 7 is a schematic cross-sectional surface of a multicore optical amplifying fiber according to a sixth embodiment, and illustrates a cross-sectional surface of the multicore optical amplifying fiber in a perpendicular direction to an axial direction. As compared to the multicore optical amplifying fiber 1 according to the first embodiment, a multicore optical amplifying fiber 6 differs in the way that regions R4 are present in the inner cladding portion 1*b* and that the air bubbles 1*d* are present only within the regions R4. Meanwhile, in FIG. 7, air bubbles are not illustrated.

Each region R4 is formed in a concentric manner with respect to the corresponding core portion 1*a*; and has a circular tube shape extending in the axial direction Dz along the corresponding core portion 1*a*. In the cross-sectional surface orthogonal to the axial direction Dz of the multicore optical amplifying fiber 6, the regions R4 may be present in a toric region that is separated from the core portions 1*a* by a distance equal to or greater than the core diameter.

In the multicore optical amplifying fiber 6 configured in the manner explained above, in an identical manner to the multicore optical amplifying fibers 3 to 5, improvement is achieved in the excitation efficiency. Moreover, in the multicore optical amplifying fiber 6, it becomes possible to hold down re-scattering of the pumping light and to curb the impact of the air bubbles id on the light propagation characteristics of the core portions 1*a*. Furthermore, if the density of air bubbles is kept mutually different among the regions R4 corresponding to the core portions 1*a*, then the impact of the air bubbles with respect to each core portion 1*a* may be adjusted to be different.

The multicore optical amplifying fiber 6 may be manufactured according to a known multicore fiber manufacturing method. For example, in the case of implementing the hole drilling method, on a base material rod, seven holes are formed that extend in parallel in an axial direction; and, in each hole, a core rod made of a glass rod is inserted that includes a portion representing the core portion 1*a* and a portion representing a part of the inner cladding portion 1*b*. Consequently, a base material is formed. Then, optical fiber drawing of the base material is performed, and the outer cladding portion 1*c* is formed.

In the method explained above, if the outer periphery of the core rods or the inner surface of the holes in the glass rod is kept relatively rough; then, during the subsequent heat treatment, air bubbles develop at the interface between the outer periphery of the core rods and the inner surface of the holes in the glass rod. The heat treatment resulting in air bubble formation implies, for example, a draining process of the base material, or an integration process of the base material rod and the core rods, or the optical fiber drawing process. As a result, air bubble regions representing the regions R4 are formed in which air bubbles are present. Regarding the method by which the outer periphery of the core rods or the inner surface of the glass rod is kept relatively rough, for example, the following method is available. For example, the concerned surface is subjected to surface roughening by chemical treatment of hydrofluoric acid. In that case, on the surface, a mask layer having a plurality of holes may be formed using Teflon (registered trademark), and chemical treatment may be performed on the mask layer.

Alternatively, a plurality of linear grooves may be formed along the longitudinal direction of the concerned surface, or one or more helical grooves may be formed; and the grooves may be roughened.

Moreover, at the time of forming the base material, if a large number of glass tubes is inserted in the gap present between the holes in the glass rod and the core rods, and if optical fiber drawing is performed in such a way that the holes in the glass tube are not closed during the heat treatment, it results in the formation of air bubbles that are continuous in the longitudinal direction.

Figure 8:
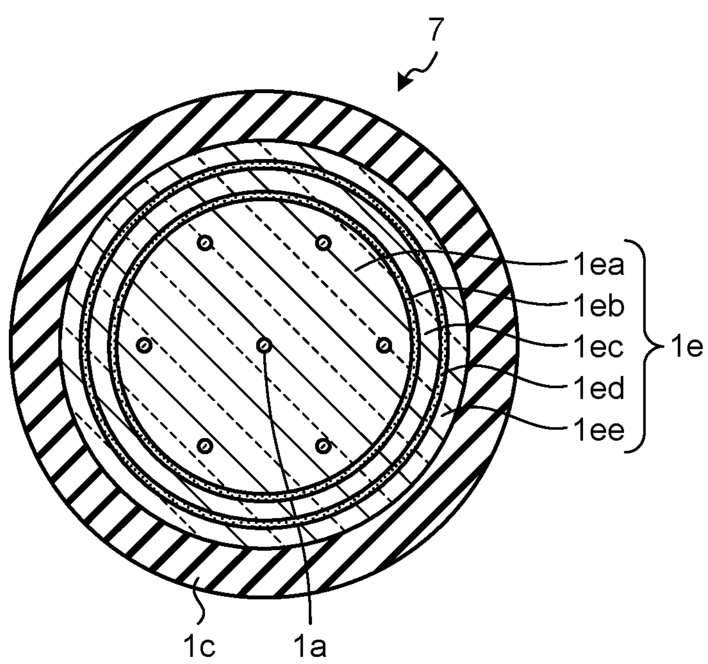
FIG. 8 is a schematic cross-sectional surface of a multicore optical amplifying fiber according to a seventh embodiment.

FIG. 8 is a schematic cross-sectional surface of a multicore optical amplifying fiber according to a seventh embodiment. A multicore optical amplifying fiber 7 is configured by replacing the inner cladding portion 1*b*, which is included in the multicore optical amplifying fiber 1 illustrated in FIG. 1 according to the first embodiment, by an inner cladding portion 1*e*.

The inner cladding portion 1*e* includes the following: an inner cladding portion lea having a circular cross-sectional surface; a toric and laminated air bubble region 1*eb* that encloses the inner cladding portion 1*ea*; a toric and laminated inner cladding portion 1*ec* that encloses the air bubble region 1*eb*; a toric and laminated air bubble region 1*ed* that encloses the inner cladding portion 1*ec*; and a toric and laminated inner cladding portion 1*ee* that encloses the air bubble region 1*ed*. The inner cladding portions 1*ea*, 1*ec*, and 1*ee* as well as the air bubble regions 1*eb* and 1*ed* may be formed using a glass material identical to that used in the inner cladding portion 1*b*. The air bubble regions 1*eb* and 1*ed* are the regions in which a plurality of air bubbles 1*d* is formed in the glass material. In the seventh embodiment, although no air bubbles are formed in the inner cladding portions 1*ea*, 1*ec*, and 1*ee*; air bubbles may be formed therein at a lower density than the density of air bubbles in the air bubble regions 1*eb* and 1*ed*.

If the inner cladding portions 1*ec* and 1*ee* are treated as the layers having a low density of air bubbles, and if the air bubble regions 1*eb* and 1*ed* are treated as the layers having a high density of air bubbles; then, in the inner cladding portion 1*e*, four layers are present in a radial direction that include two or more layers having a high density of air bubbles or two or more layers having a low density of air bubbles.

In the multicore optical amplifying fiber 7 configured in the manner explained above, in an identical manner to the multicore optical amplifying fibers 3 to 6, improvement is achieved in the excitation efficiency. Moreover, the impact of the air bubbles may be adjusted by adjusting the number of layers having either a low density of air bubbles or a high density of air bubbles in a radial direction, or by adjusting the thickness of such layers, or by adjusting the density of the air bubbles. For example, the design may be such that there is one or more layers having a low density of air bubbles and there is one or more layers having a high density of air bubbles, thereby resulting in a total of two or more layers.

The multicore optical amplifying fiber 7 may be manufactured according to a known multicore fiber manufacturing method. For example, in the case of implementing the hole drilling method, on a base material rod, seven holes are formed that extend in parallel in an axial direction; and, in each hole, a core rod made of a glass rod is inserted includes a portion representing the core portion 1*a* and a portion representing a part of the inner cladding portion 1*ea*. Consequently, a base material is formed. Then, optical fiber drawing of the base material is performed, and the outer cladding portion 1*c* is formed.

The base material rod used in the method explained above may be manufactured according to the VAD (Vapor-phase Axial Deposition), or the OVD (Outside Vapor Deposition) method, or the MCVD (Modified Chemical Vapor Deposition) method, or the plasma CVD method. Regarding the base material rod, soot layers made of glass particles, namely, a soot layer representing the inner cladding portion 1*ea*, a soot layer representing the inner cladding portion 1*ec*, and a soot layer representing the inner cladding portion 1*ee* are deposited; and draining and vitrification is performed by heat treatment. As a result, the base material rod is formed. At that time, if soot layers made of mutually different composition materials are deposited as the neighboring soot layers; then, during the subsequent heat treatment, air bubbles develop at the interface between those soot layers, thereby resulting in the formation of the portions representing the air bubble regions 1*eb* and 1*ed*. For example, different composition materials imply silica glass added with dopants that include alkali metals, such as fluorine (F), germanium (G), phosphorous (P), natrium (N), and potassium (K); and chlorine (Cl). A dopant represents an example of a dopant meant for varying the viscosity of silica glass. As a result of adding dopants, it is believed that, during the heat treatment, stress is exerted on the interface between the different composition materials, which results in the formation of air bubbles. Moreover, dopants may also be used for varying the refractive index of silica glass. Thus, it is desirable that the refractive indexes of the soot layers are kept identical by adding one or more of the selected dopants or by not adding any dopant.

Meanwhile, the base material rod used in the method explained above may be manufactured also according to the jacketing method. In that case, the glass rod representing the inner cladding portion 1*ea* is inserted in a jacketed tube representing the inner cladding portion 1*ec*; then the inner cladding portion 1*ec* is further inserted in a jacketed tube; and the jacketed tubes are integrated by heat treatment. As a result, the base material rod is formed. In the case of implementing the jacketing method, the glass rod and the jacketed tubes may be made of mutually different composition materials, and the outer periphery of the core rods or the inner and outer surfaces of the jacketed tubes may be kept relatively rough.

Figure 9:
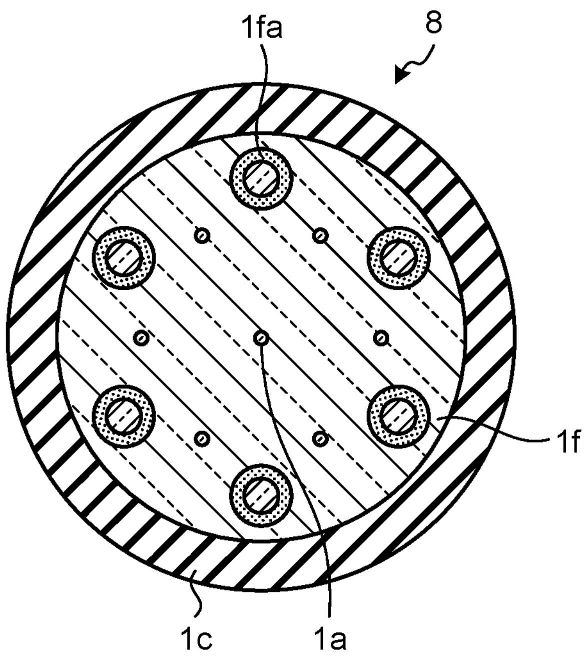
FIG. 9 is a schematic cross-sectional surface of a multicore optical amplifying fiber according to an eighth embodiment.

FIG. 9 is a schematic cross-sectional surface of a multicore optical amplifying fiber according to an eighth embodiment. A multicore optical amplifying fiber 8 is configured by replacing the inner cladding portion 1*b*, which is included in the multicore optical amplifying fiber 1 illustrated in FIG. 1 according to the first embodiment, by an inner cladding portion 1*f*. The inner cladding portion 1*f* is configured when a plurality of air bubble regions 1*fa* having a toric cross-sectional surface is formed in the inner cladding portion 1*b*. In the eighth embodiment, six air bubble regions 1*fa* are formed. However, there is no restriction on the number of air bubble regions 1*fa*. The air bubble regions 1*fa* represent an example of the regions in which air bubbles are present.

The air bubble regions 1*fa* are present on the outer periphery of the regular hexagon formed by the core portions 1*a*. Moreover, the air bubble regions 1*fa* are positioned in a rotation symmetry around the center of the multicore optical amplifying fiber 8. In the eighth embodiment, the air bubble regions 1*fa* are positioned in a 6-fold rotation symmetry. Furthermore, when a hexagonal close-packed lattice is defined in the cross-sectional surface perpendicular to an axial direction of the multicore optical amplifying fiber 8, the air bubble regions 1*fa* are positioned at the lattice points.

In the multicore optical amplifying fiber 8 configured in the manner explained above, in an identical manner to the multicore optical amplifying fibers 3 to 7, improvement is achieved in the excitation efficiency. Moreover, by adjusting the positions and the rotation symmetry of the air bubble regions 1*fa*, the impact of the air bubbles may be adjusted. For example, it is possible to have a 2-fold rotation symmetry or a 3-fold rotation symmetry.

Meanwhile, the air bubble regions 1*fa* may be present on the inner periphery side or on the same periphery as the regular hexagon formed by the core portions 1*a*.

The multicore optical amplifying fiber 8 may be manufactured according to a known multicore fiber manufacturing method. For example, explained below with reference to FIG. 10 is the case of implementing the hole drilling method.

Figure 10:
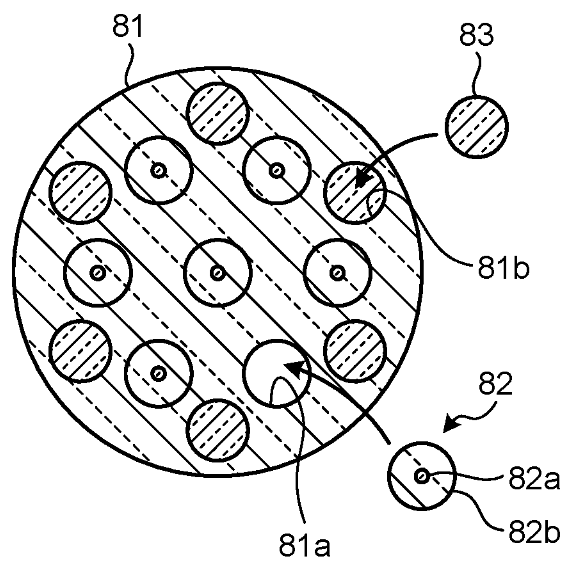
FIG. 10 is an explanatory diagram about an example of a method for manufacturing the multicore optical amplifying fiber according to the eighth embodiment.

As illustrated in FIG. 10, on a base material rod 81 representing a part of the inner cladding portion 1*f*, seven holes 81*a* are formed that extend in parallel in an axial direction; and six holes 81*b* are formed. Then, core rods 82 are inserted in the holes 81*a*; glass rods 83 are inserted in the holes 81*b*; and a base material is formed. Each core rod 82 includes a core portion 82*a* representing the core portion 1*a*, and includes a cladding portion 82*b* that encloses the core portion 82*a* and that represents a part of the inner cladding portion 1*f*. Then, optical fiber drawing of the base material is performed, and the outer cladding portion 1*c* is formed.

The base material rod 81 and the glass rods 83 are made of mutually different composition materials. As a result, during the subsequent heat treatment, the air bubbles develop on the interface between the base material rod 81 and the glass rods 83, thereby resulting in the formation of the portions representing the air bubble regions 1*fa*. Meanwhile, in place of or in combination with the method in which the base material rod 81 and the glass rods 83 have mutually different composition materials, the outer periphery of the glass rods 83 or the inner surface of the holes 81*b* may be kept relatively rough. Moreover, apart from these methods or in combination with these methods, it is possible to implement a method in which a large number of glass tubes is inserted in the gap present between the holes 81*b* and the core rods 83; and optical fiber drawing is performed in such a way that the holes in the glass tube are not closed during the heat treatment. It results in the formation of air bubbles that are continuous in the longitudinal direction.

Figure 11:
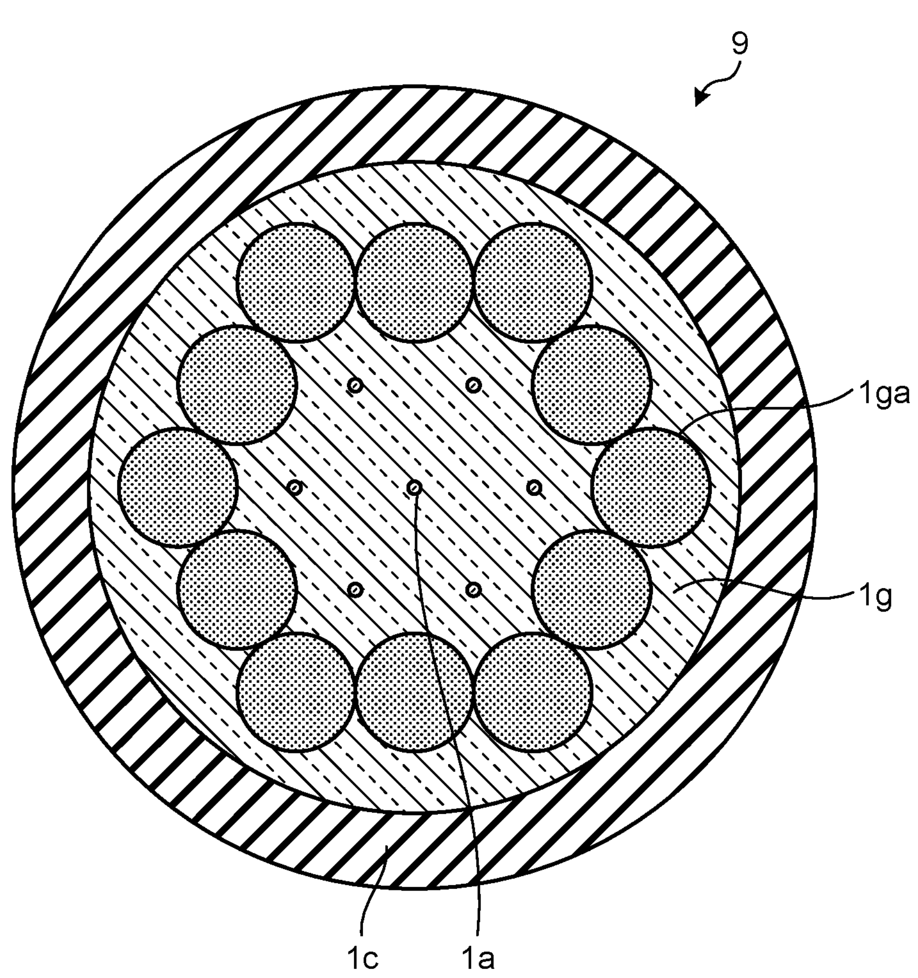
FIG. 11 is a schematic cross-sectional surface of a multicore optical amplifying fiber according to a ninth embodiment.

FIG. 11 is a schematic cross-sectional surface of a multicore optical amplifying fiber according to a ninth embodiment. A multicore optical amplifying fiber 9 is configured by replacing the inner cladding portion 1*b*, which is included in the multicore optical amplifying fiber 1 illustrated in FIG. 1 according to the first embodiment, by an inner cladding portion 1*g*. The inner cladding portion 1*g* is configured when a plurality of air bubble regions 1*ga* having a circular cross-sectional surface is formed in the inner cladding portion 1*b*. In the ninth embodiment, 12 air bubble regions 1*ga* are formed. However, there is no restriction on the number of air bubble regions 1*ga*. The air bubble regions 1*ga* represent an example of the regions in which air bubbles are present.

The air bubble regions 1*ga* are present on the outer periphery of the regular hexagon formed by the core portions 1*a*. Moreover, the air bubble regions 1*ga* are positioned in a rotation symmetry around the center of the multicore optical amplifying fiber 9. In the ninth embodiment, the air bubble regions 1*ga* are positioned in a 6-fold rotation symmetry. Furthermore, when a hexagonal close-packed lattice is defined in the cross-sectional surface perpendicular to an axial direction of the multicore optical amplifying fiber 9, the air bubble regions 1*ga* are positioned at the lattice points. Moreover, in the ninth embodiment, the core portions 1*a* and the air bubble regions 1*ga* are positioned at the lattice points of the same hexagonal close-packed lattice.

In the multicore optical amplifying fiber 9 configured in the manner explained above, in an identical manner to the multicore optical amplifying fibers 3 to 8, improvement is achieved in the excitation efficiency. Moreover, as a result of adjusting the positions, the count, and the rotation symmetry of the air bubble regions 1*ga*, the impact of the air bubbles may be adjusted.

Meanwhile, the air bubble regions 1*ga* may be present on the inner periphery side or on the same periphery as the regular hexagon formed by the core portions 1*a*. Moreover, the number of air bubble regions 1*ga* may be appropriately increased or reduced from the count of 12.

The multicore optical amplifying fiber 9 may be manufactured according to a known multicore fiber manufacturing method. For example, explained below with reference to FIG. 12 is the case of implementing the stacking method.

Figure 12:
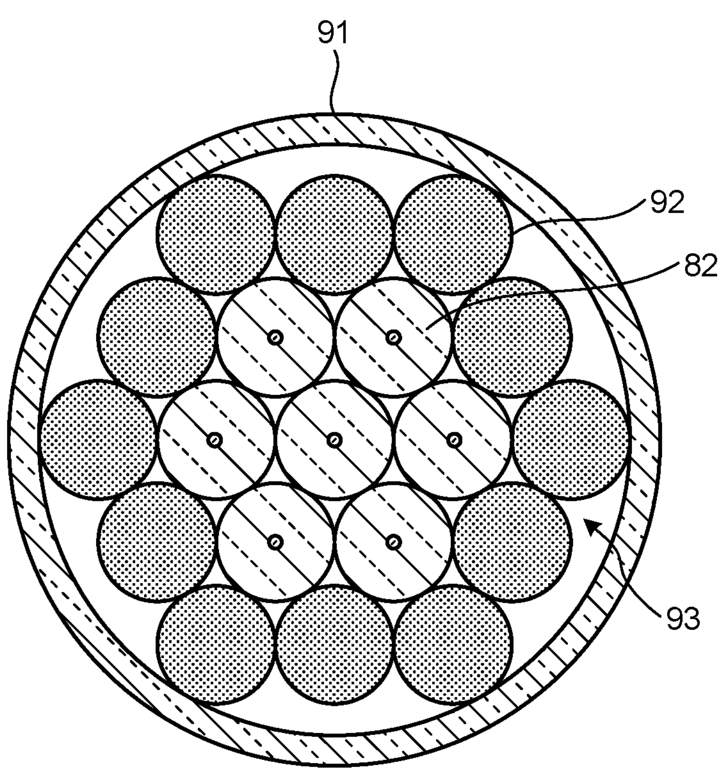
FIG. 12 is an explanatory diagram about an example of a method for manufacturing the multicore optical amplifying fiber according to the ninth embodiment.

As illustrated in FIG. 12, seven core rods 82 are stacked inside a glass tube 91 representing a part of the inner cladding portion 1*g*. Besides, in a gap 93 present between the core rods 82 and the glass tube 91, glass rods 92 representing a part of the inner cladding portion 1*b* are stacked to enable easy formation of air bubbles on the inside and on the outer periphery after the optical fiber drawing process; and a base material is formed. Herein, if the core rods 82 and the glass rods 92 are configured to have the same diameter, the core portions 1*a* and the air bubble regions 1*ga* may be positioned at the lattice points of the same hexagonal close-packed lattice. In the remaining portion of the gap 93, glass rods are stacked to enable easy formation of air bubbles on the inside and on the outer periphery after the optical fiber drawing process. Subsequently, optical fiber drawing of the base material is performed, and the outer cladding portion 1*c* is formed. In that case, in each air bubble region 1*ga*, the air bubbles happen to be present in a toric shape that is centered around the corresponding lattice point of the hexagonal close-packed lattice and that has the radius equal to or smaller than half of the inter-lattice-point distance. For example, the inter-lattice-point distance represents the distance between the center of any core rod 82 and the center of the neighboring glass rod 92. Meanwhile, in order to reduce the number of air bubble regions 1*ga* from the count 12, one or more of the 12 glass rods 92 may be replaced by such glass rods which do not cause formation of air bubbles on the inside and on the outer periphery after the optical fiber drawing process.

Moreover, a large number of glass tubes may be stacked in place of the glass rods 92; and optical fiber drawing may be performed in such a way that the holes in the glass tubes are not closed during the heat treatment. It results in the formation of air bubbles that are continuous in the longitudinal direction.

Figure 13:
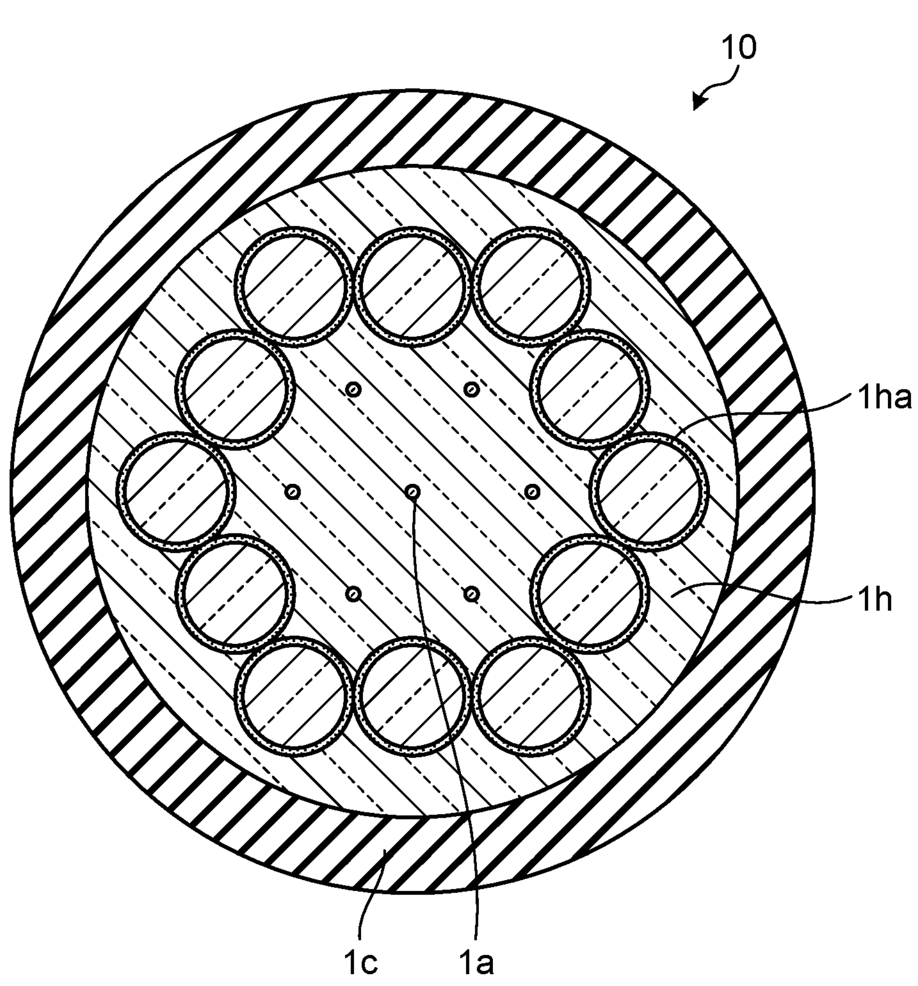
FIG. 13 is a schematic cross-sectional surface of a multicore optical amplifying fiber according to a 10-th embodiment.

FIG. 13 is a schematic cross-sectional surface of a multicore optical amplifying fiber according to a 10-th embodiment. A multicore optical amplifying fiber 10 is configured by replacing the inner cladding portion 1*b*, which is included in the multicore optical amplifying fiber 1 illustrated in FIG. 1 according to the first embodiment, by an inner cladding portion 1*h*. The inner cladding portion 1*h* is configured as a result of forming, in the inner cladding portion 1*b*, a plurality of air bubble regions 1*ha* having a toric cross-sectional surface. In the 10-th embodiment, 12 air bubble regions 1*ha* are formed. However, there is no restriction on the number of air bubble regions 1*ha*. The air bubble regions 1*ha* represent an example of the regions in which air bubbles are present. In the inner cladding portion 1*h*, the inside of the air bubble regions 1*ha* and the outside of the air bubble regions 1*ha* have mutually different composition materials, and may or may not have the same refractive index.

The air bubble regions 1*ha* are present on the outer periphery of the regular hexagon formed by the core portions 1*a*. Moreover, the air bubble regions 1*ha* are positioned in a rotation symmetry around the center of the multicore optical amplifying fiber 10. In the 10-th embodiment, the air bubble regions 1*ha* are positioned in a 6-fold rotation symmetry. Furthermore, when a hexagonal close-packed lattice is defined in the cross-sectional surface perpendicular to an axial direction of the multicore optical amplifying fiber 10, the air bubble regions 1*ha* are positioned at the lattice points. Moreover, in the 10-th embodiment, the core portions 1*a* and the air bubble regions 1*ha* are positioned at the lattice points of the same hexagonal close-packed lattice.

In the multicore optical amplifying fiber 10 configured in the manner explained above, in an identical manner to the multicore optical amplifying fibers 3 to 9, improvement is achieved in the excitation efficiency. Moreover, as a result of adjusting the positions, the count, and the rotation symmetry of the air bubble regions 1*ha*, the impact of the air bubbles may be adjusted.

Meanwhile, the air bubble regions 1*ha* may be present on the inner periphery side or on the same periphery as the regular hexagon formed by the core portions 1*a*. Moreover, the number of air bubble regions 1*ha* may be appropriately increased or reduced from the count 12.

The multicore optical amplifying fiber 10 may be manufactured according to a known multicore fiber manufacturing method. For example, explained below with reference to FIG. 14 is the case of implementing the stacking method.

Figure 14:
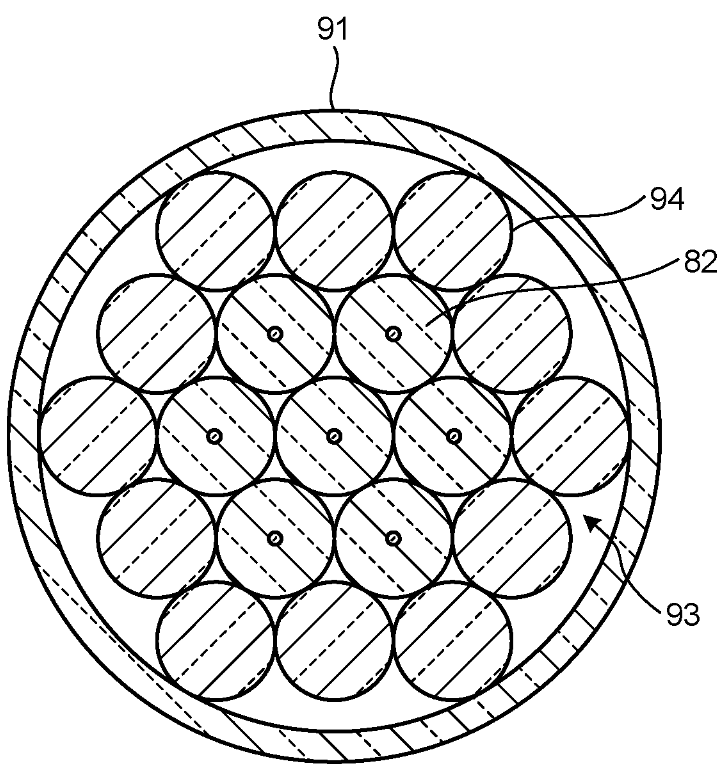
FIG. 14 is an explanatory diagram about an example of a method for manufacturing the multicore optical amplifying fiber according to the 10-th embodiment.

As illustrated in FIG. 14, the seven core rods 82 are stacked inside the glass tube 91 representing a part of the inner cladding portion 1*h*. Besides, in the gap 93 present between the core rods 82 and the glass tube 91, 12 glass rods 94 are stacked, and a base material is formed. The glass rods 94 have different composition materials than the different composition materials of the glass tube 91 and the cladding portion 82*b* of the core rods 82. Herein, if the core rods 82 and the glass rods 94 are configured to have the same diameter, the core portions 1*a* and the air bubble regions 1*ha* may be positioned at the lattice points of the same hexagonal close-packed lattice. In the remaining portion of the gap 93, such glass rods are stacked which may or may not include air bubbles and which have the same composition as the glass tube 91. As a result, during any subsequent heat treatment, the portions representing the air bubble regions 1*ha* are formed at the interface between the glass rods 94 and the surrounding portions. Meanwhile, in order to reduce the number of air bubble regions 1*ha* from the count 12, one or more of the 12 glass rods 94 may be replaced by glass rods having the same composition materials as the glass tube 91.

Meanwhile, in place of or in combination with the method in which the glass rods 94 have different composition materials than the glass tube 91 and the cladding portion 82*b* of the core rods 82, the outer periphery of the glass rods 94 may be kept relatively rough. Alternatively, a large number of glass tubes may be stacked in place of the glass rods 92; and optical fiber drawing may be performed in such a way that the holes in the glass tubes are not closed during the heat treatment. It results in the formation of air bubbles that are continuous in the longitudinal direction.

Given below is the detailed explanation about a method for controlling the diameter of the air bubbles 1*d*. When a glass member such as a base material rod or a glass slot is formed by depositing soot layers and performing draining and vitrification by heat treatment; usually, during the sintering process, heat treatment is performed by circulating an inert gas. For example, helium (He) gas is circulated for the purpose of reducing the OH radical during vitrification. The He gas enters the gap formed among the glass particles. However, when the soot layers get consolidated thereby resulting in vitrification, the He gas gets confined inside the glass and turns into air bubbles. Herein, in the case of circulating the He gas, relatively large air bubbles are formed with ease.

Regarding this phenomenon, when the inventors of the present disclosure carried out keen examination, it was understood that, since the He gas has a small atomic weight or a small molecular weight, even if the soot gets consolidated, the He gas may still easily diffuse to some extent inside the soot and may coagulate, thereby resulting in easy formation of relatively large air bubbles. In that regard, the present inventors presumed that updating the atomic weight or the molecular weight of the gas circulated at the time of vitrification would enable controlling the diameter of the air bubbles. For example, as an inert gas, if a rare gas, such as the argon (Ar) gas or the xenon (Xe) gas, that is a large-molecular-weight gas having a greater atomic weight or a greater molecular weight than the He gas is circulated; then relatively smaller air bubbles may be formed because the ease of diffusion or the extent of coagulation is lower than the He gas. Alternatively, it is also possible to circulate a mixed gas of the He gas and a large-molecular-weight gas. In that case, if the partial pressure or the flow ratio of the large-molecular-weight gas in the mixed gas is increased, then the diameter of the air bubbles may be relatively reduced. Thus, the diameter may be controlled by controlling the partial pressure or the flow ratio.

Figure 15:
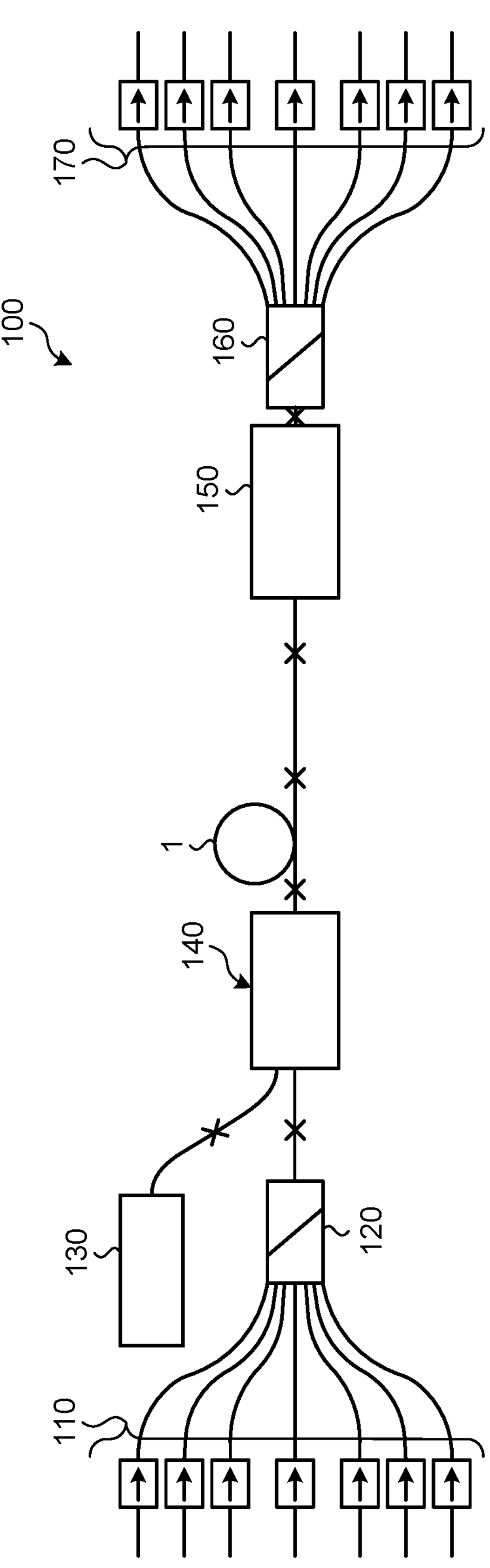
FIG. 15 is a schematic diagram illustrating a configuration of a multicore optical fiber amplifier according to an 11-th embodiment.

FIG. 15 is a schematic diagram illustrating a configuration of a multicore optical fiber amplifier according to an 11-th embodiment. In the following explanation, a multicore optical fiber amplifier is sometimes simply referred to as an optical amplifier. An optical amplifier 100 includes the following constituent elements: seven optical isolators 110; an optical fiber fan in (FAN IN) 120; a semiconductor laser 130; an optical coupler 140; the multicore optical amplifying fiber 1 according to the first embodiment; a pump stripper 150; an optical fiber fan out (FAN OUT) 160; and seven optical isolators 170. In FIG. 15, the symbols "x" represent the fusion splicing points of the optical fiber.

The optical fiber fan in 120 includes seven bundled single-mode optical fibers and a single multicore fiber having seven core portions; and is configured in such a way that, in the coupling portion, the core portions of the seven single-mode optical fibers undergo optical coupling with the core portions of the multicore fiber. The seven single-mode optical fibers are standard single-mode optical fibers defined in, for example, ITU-T G.652; and have the optical isolators 110 disposed on an individual basis. The optical isolators 110 and the optical isolators 170 let the light through in the direction indicated by arrows, and block the passage of light in the opposite direction. The multicore fiber of the optical fiber fan in 120 is connected to the optical coupler 140. The end face at which the seven bundled single-mode optical fibers and the multicore fiber undergo optical coupling is processed to be at an incline with respect to the optical axis for the purpose of reflection suppression. However, alternatively, the end face may be kept perpendicular with respect to the optical axis. Meanwhile, instead of using seven optical isolators 110 or seven optical isolators 170, it is possible to use an optical isolator having a plurality of (in the 11-th embodiment, seven) single-mode optical fibers integrated therein.

In an identical manner to the multicore optical amplifying fiber 1, the multicore fiber of the optical fiber fan in 120 includes seven core portions placed in a triangular lattice, and includes a cladding portion that is positioned on the outer periphery of the core portions and that has a lower refractive index than the maximum refractive index of the core portions. When signal lights are input to the single-mode optical fibers of the optical fiber fan in 120, the corresponding optical isolators 110 let the signal lights through, and the core portions of the multicore fiber propagate the signal lights.

The semiconductor laser 130 representing a pumping light source is a transverse multimode semiconductor laser that outputs a pumping light. The wavelength of the pumping light is 976 nm that is substantially identical to, for example, the wavelength of the absorption peak in the wavelength range of 900 nm of Er. As a result, the pumping light enables optical excitation of the erbium ions. The semiconductor laser 130 outputs the pumping light from a multimode optical fiber. The multimode optical fiber is of the step-index type having the core diameter/cladding diameter of, for example, 105 μm/125 μm, and having the NA of, for example, 0.16 or 0.22.

The optical coupler 140 includes a main optical fiber and a pumping light supplying optical fiber. The main optical fiber is a double-clad optical fiber that includes: seven core portions placed in a triangular lattice in an identical manner to the core portions of the multicore fiber of the optical fiber fan in 120; an inner cladding portion that is positioned on the outer periphery of the core portions and that has a lower refractive index than the maximum refractive index of the core portions; and an outer cladding portion that is positioned on the outer periphery of the inner cladding portion and that has a lower refractive index than the refractive index of the inner cladding portion. The core portions and the inner cladding portion are made of silica based glass, and the outer cladding portion is made of resin.

The pumping light supplying optical fiber is a multimode optical fiber of the same type as the multimode optical fiber of the semiconductor laser 130, and has one end thereof connected to the multimode optical fiber of the semiconductor laser 130. The pumping light supplying optical fiber is of the step-index type having the core diameter/cladding diameter of, for example, 105 μm/125 μm, and having the NA of, for example, 0.16 or 0.22. The pumping light supplying optical fiber receives input of the pumping light from the semiconductor laser 130, and supplies the pumping light to the main optical fiber. The inner cladding portion propagates the pumping light.

The main optical fiber of the optical coupler 140 has one end thereof connected to the multicore fiber of the optical fiber fan in 120. The core portions of the multicore fiber are connected to the core portions of the main optical fiber. Thus, when the signal lights that have propagated through the core portions of the multicore fiber are input to the main optical fiber, optical coupling occurs in the core portions. Then, the core portions propagate the signal lights. The pumping light and the signal lights are output from the main optical fiber to the multicore optical amplifying fiber 1.

The multicore optical amplifying fiber 1 has one end thereof connected to the main optical fiber of the optical coupler 140. The core portions 1*a* of the multicore optical amplifying fiber 1 are connected to the core portions of the main optical fiber. Moreover, the inner cladding portion 1*b* of the multicore optical amplifying fiber 1 is connected to the inner cladding portion of the main optical fiber. Thus, when the signal lights and the pumping light that have propagated through the main optical fiber are input to the multicore optical amplifying fiber 1, they propagate through the core portions 1*a* and the inner cladding portion 1*b* in the same direction. The pumping light propagates through the inner cladding portion 1*b* and causes optical excitation of Er in the core portions 1*a*. The signal light propagating through each core portion 1*a* gets optically amplified due to the simulated emission of Er. The multicore optical amplifying fiber 1 outputs the signal lights that have been optically amplified, and also outputs the pumping light that was not involved in optical amplification.

The pump stripper 150 is a known device that removes the pumping light that was not involved in optical amplification. The pump stripper 150 is configured in the following manner: in a double-clad multicore fiber having seven core portions, some part of the outer cladding is removed, and the pumping light is retrieved from the surface of the inner cladding portion present within the removed part and is emitted onto a heat sink for absorption; so that the energy of the pumping light is converted into thermal energy, which is then released. The pump stripper 150 propagates the signal lights using the multicore fiber, as well as reduces the power of the pumping light to a level that is not problematic even when the pumping light is output from the optical amplifier 100.

In an identical manner to the optical fiber fan in 120, the optical fiber fan out 160 includes seven bundled single-mode optical fibers, and includes a single multicore fiber having seven core portions; and is configured in such a way that, in the coupling portion, the core portions of the seven single-mode optical fibers undergo optical coupling with the core portions of the multicore fiber. The single-mode optical fibers have the optical isolators 170 disposed on an individual basis. The multicore fiber is connected to the pump stripper 150. The end face at which the seven bundled single-mode optical fibers and the multicore fiber undergo optical coupling is processed to be at an incline with respect to the optical axis for the purpose of reflection suppression. However, alternatively, the end face may be kept perpendicular with respect to the optical axis.

When the signal lights are input from the core portions of the multicore fiber of the pump stripper 150 to the core portions of the optical fiber fan out 160, the signal lights propagate through the core portions of the single-mode optical fibers and are output via the corresponding optical isolators 170.

In the optical amplifier 100, optical amplification is performed using the multicore optical amplifying fiber 1 having improved excitation efficiency. That enables achieving reduction in the power consumption of the semiconductor laser 130 while achieving identical amplification characteristics.

Meanwhile, in the optical amplifier 100, any one of the multicore optical amplifying fibers 2 to 10 may be used in place of the multicore optical amplifying fiber 1.

Figure 16:
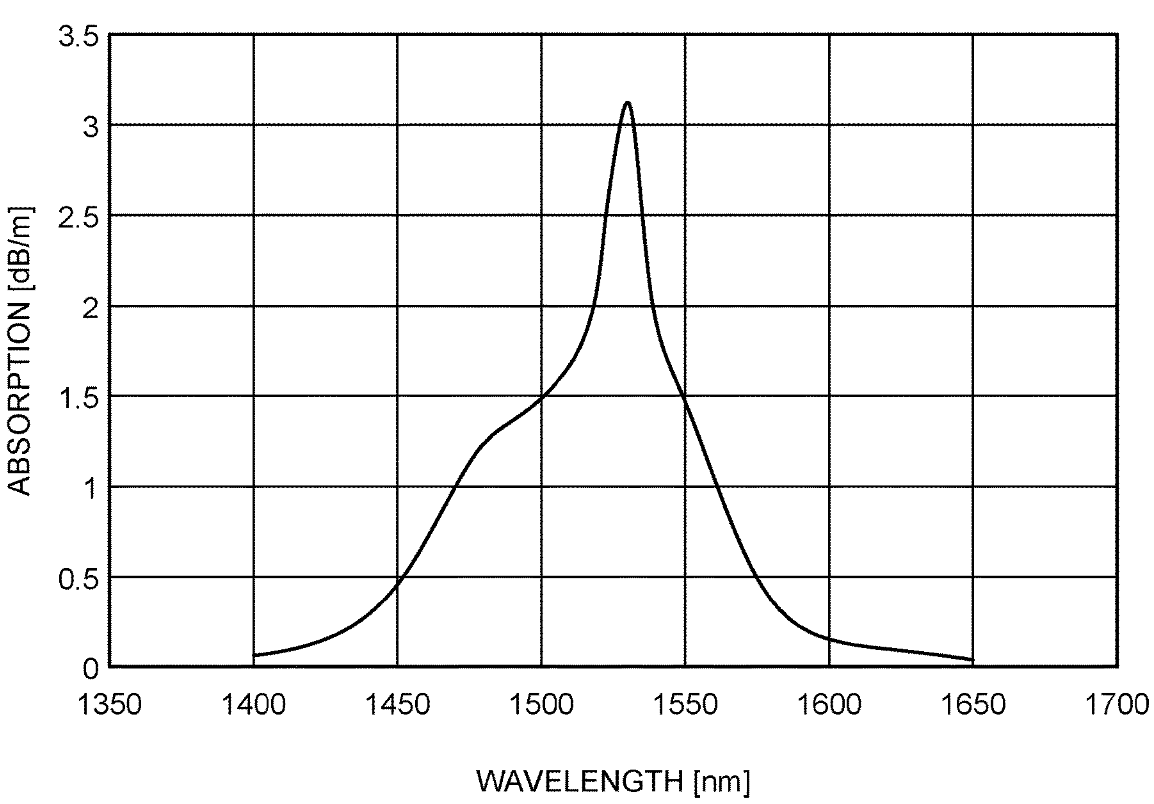
FIG. 16 is a diagram illustrating the absorption spectrum of a multicore optical amplifying fiber according to a working example.

As a working example, an optical amplifier having the configuration illustrated in FIG. 15 was manufactured. As the multicore optical amplifying fiber, the configuration illustrated in FIG. 7 was used. In the multicore optical amplifying fiber, the cross-sectional surface of the air bubbles was about 0.022 times the inner cladding diameter, and the cross-sectional ratio of the air bubbles was 4.8%. When the absorption spectrum of one of the core portions of the multicore optical amplifying fiber was measured, the absorption peak was approximately at 3.1 dB/m as illustrated in FIG. 16. When the measurement was taken for the other core portions, an identical absorption spectrum was obtained.

The length of the multicore optical amplifying fiber was 35 m, and the pumping light having the power of 16 W was supplied from a semiconductor laser. Then, from each single-mode optical fiber of the optical fiber fan in, WDM signal lights of eight channels, which were arranged at equal wavelength intervals in the range of 1530 nm to 1565 nm, were input after adjusting them to achieve the total power of −5 dBm. As a result, from each single-mode optical fiber of the optical fiber fan out, amplified signal lights were obtained that had a relatively higher level of power close to 20 dBm, such as the total power of 19.0 dBm per core portion. The inter-channel power deviation of the amplified WDM signal lights was equal to or smaller than 4 dB. Moreover, the difference of gains among the core portions of the multicore optical amplifying fiber was equal to or smaller than 3 dB in each channel.

As a comparison example, optical amplifiers were manufactured in which various multicore optical amplifying fibers having no air bubbles were used, and an experiment was carried out under identical conditions regarding the pumping light and identical conditions regarding the WDM signal lights. In each case, the total power per core portion was about 15 dBm.

Figure 17:
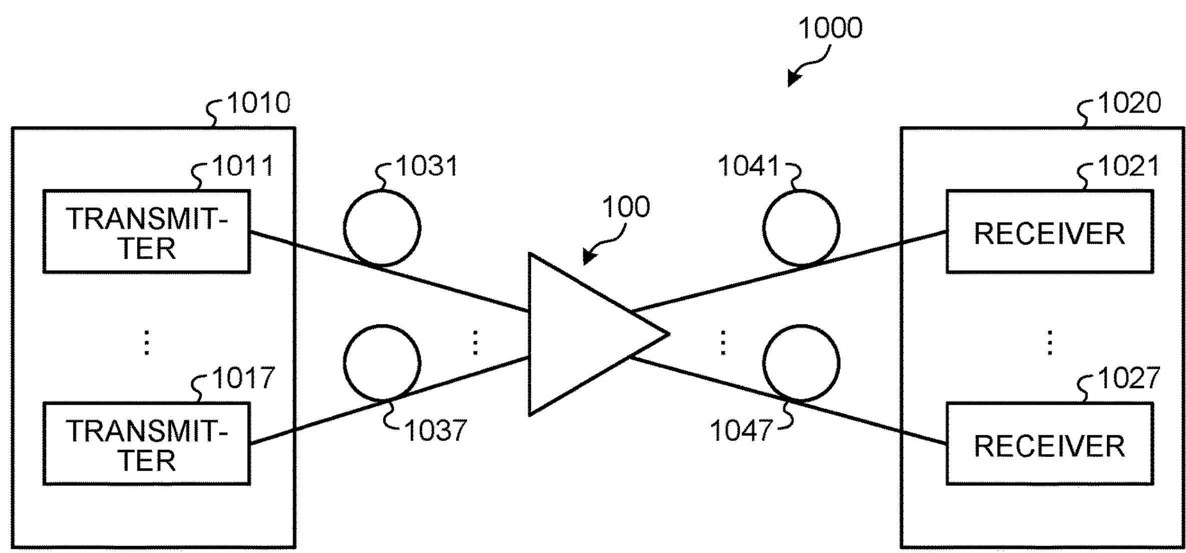
FIG. 17 is a schematic diagram illustrating a configuration of an optical communication system according to a 12-th embodiment.

FIG. 17 is a schematic diagram illustrating a configuration of an optical communication system according to a 12-th embodiment. An optical communication system 1000 includes a light transmitting device 1010, a light receiving device 1020, the optical amplifier 100 according to the 11-th embodiment, and 14 optical transmission fibers, namely, optical transmission fibers 1031 to 1037 and optical transmission fibers 1041 to 1047, all of which represent single-core optical fibers.

The light transmitting device 1010 includes seven transmitters 1011 to 1017. The transmitters 1011 to 1017 transmit signal lights. The seven optical transmission fibers 1031 to 1037 transmit the signals lights output from the transmitters 1011 to 1017, respectively, and input them to the optical amplifier 100. The optical amplifier 100 performs optical amplification of all seven signal lights input from the optical transmission fibers 1031 to 1037, and outputs the amplified signal lights to the optical transmission fibers 1041 to 1047, respectively. Then, the optical transmission fibers 1041 to 1047 transmit the amplified signal lights and input them to the light receiving device 1020. The light receiving device 1020 includes seven receivers 1021 to 1027. Thus, the receivers 1021 to 1027 receive the amplified signal lights transmitted by the light transmission fibers 1041 to 1047, respectively, and convert them into electrical signals.

In the optical communication system 1000, since the optical amplifier 100 is used that achieves identical amplification characteristics at reduced power consumption, optical communication having reduced power consumption may be achieved. In the 12-th embodiment, although the optical transmission fiber includes seven single-core optical fibers, it is also possible to use an optical transmission fiber made of a single seven-core-type multicore fiber.

If the optical communication system 1000 is a long-distance communication system, then the optical amplifier 100 may be used as a repeating amplifier, or a preamplifier, or a booster amplifier. If the optical communication system 1000 is a network system in which a ROADM (Reconfigurable Optical Add/Drop Multiplexer) is used, then the optical amplifier 100 may be used in loss compensation.

Meanwhile, in the embodiments described above, the core portions of a multicore optical amplifying fiber include only Er as a rare-earth element. However, alternatively, the multicore optical amplifying fiber may include only some other rare-earth element, such as ytterbium (Yb), other than Er; or may include Er as well as Yb.

In the embodiments described above, although the core portions of a multicore optical amplifying fiber are placed in a triangular lattice, they may alternatively be placed in a square lattice. Moreover, as long as a plurality of core portions is included in a multicore optical amplifying fiber, there is no particular restriction on the number of core portions. Furthermore, in the embodiments described above, an optical amplifying fiber is a multicore optical amplifying fiber. However, as an embodiment, it is also possible to use a single-core optical amplifying fiber that includes only a single core portion enclosed in the inner cladding portion.

Herein, although the present disclosure is described with reference to the abovementioned embodiments for a complete and clear disclosure, the appended claims are not to be thus limited but are to be construed as embodying all modifications and alternative constructions that may occur to one skilled in the art that fairly fall within the basic teaching herein set forth.

The present disclosure may be used in an optical amplifying fiber, an optical fiber amplifier, and an optical communication system.

According to the present disclosure, it becomes possible to implement an optical amplifying fiber having improved efficiency.

Although the disclosure has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber amplifier comprising:

an optical amplifying fiber comprising:

at least one single core portion doped with a rare-earth element;

an inner cladding portion configured to enclose the at least one core portion, the inner cladding portion having a lower refractive index than maximum refractive index of each core portion; and an outer cladding portion configured to enclose the inner cladding portion, the outer cladding portion having a lower refractive index than refractive index of the inner cladding portion, wherein the inner cladding portion includes a plurality of air bubbles;

a pumping light source configured to output pumping light for causing optical excitation of the rare-earth element present in the optical amplifying fiber;

an optical coupler configured to cause optical coupling of the pumping light with the inner cladding portion; and a plurality of core portions as the at least one single core portion, wherein difference of gains among the plurality of core portions is equal to or smaller than 3 dB.

2. The optical fiber amplifier including the optical amplifying fiber according to claim 1, wherein, in cross-sectional surface orthogonal to axial direction of the optical amplifying fiber, sum total of cross-sectional areas of the plurality of air bubbles with respect to cross-sectional area of the inner cladding portion is equal to or greater than 0.1% and equal to smaller than 30%.

3. The optical fiber amplifier including the optical amplifying fiber according to claim 1, wherein diameter of the air bubbles is equal to or greater than 1/2000 times and equal to or smaller than as twice as wavelength of light propagating through the inner cladding portion.

4. The optical fiber amplifier including the optical amplifying fiber according to claim 1, wherein, in cross-sectional surface orthogonal to axial direction of the optical amplifying fiber, the air bubbles are present in a cylindrical region separated from the core portion by distance equal to or greater than core diameter.

5. The optical fiber amplifier including the optical amplifying fiber according to claim 1, wherein, in radial direction of each portion of the optical amplifying fiber, the air bubbles have substantially uniform distribution.

6. The optical fiber amplifier including the optical amplifying fiber according to claim 1, wherein, in axial direction of the optical amplifying fiber, the air bubbles have substantially uniform distribution.

7. The optical fiber amplifier including the optical amplifying fiber according to claim 1, wherein, in axial-rotation direction of each core portion of the optical amplifying fiber, the air bubbles have substantially uniform distribution.

8. The optical fiber amplifier including the optical amplifying fiber according to claim 1, wherein a plurality of core portions is included as at least a single core portion, and a cylindrical boundary surface having a circular cross-section and extending in the axial direction, the cylindrical boundary surface passing through core portions that are centered around a center of the optical amplifying fiber and that are farthest from the center among the core portions centered around the center, wherein the density of the air bubbles inside the cylindrical boundary surface differs from the density of the air bubbles outside the cylindrical boundary surface.

9. The optical fiber amplifier including the optical amplifying fiber according to claim 1, wherein the rare-earth element includes erbium.

10. The optical fiber amplifier including the optical amplifying fiber according to claim 1, wherein, in the inner cladding portion, in cross-sectional surface orthogonal to axial direction of the optical amplifying fiber, two or more layers having low density of air bubbles are present or two or more layers having high density of air bubbles are present.

11. The optical fiber amplifier including the optical amplifying fiber according to claim 1, wherein, in cross-sectional surface orthogonal to axial direction of the optical amplifying fiber, the air bubbles are separated from the core portion by distance equal to or greater than core diameter.

12. The optical fiber amplifier including the optical amplifying fiber according to claim 1, wherein regions of the air bubbles are positioned in a rotationally symmetry around center of the optical amplifying fiber.

13. The optical fiber amplifier including the optical amplifying fiber according to claim 1, wherein, when a hexagonal close-packed lattice is defined in cross-sectional surface perpendicular to axial direction of the optical amplifying fiber, regions of the air bubbles are positioned at lattice points.

14. The optical fiber amplifier including the optical amplifying fiber according to claim 1, wherein, when a hexagonal close-packed lattice is defined in cross-sectional surface perpendicular to axial direction of the optical amplifying fiber, the air bubbles are present in toric shape that is centered around particular lattice point and that has radius equal to or smaller than half of inter-lattice-point distance.

15. An optical amplifying fiber comprising:

at least one single core portion doped with a rare-earth element;

an inner cladding portion configured to enclose the at least one core portion, the inner cladding portion having a lower refractive index than maximum refractive index of each core portion; and an outer cladding portion configured to enclose the inner cladding portion, the outer cladding portion having a lower refractive index than refractive index of the inner cladding portion, wherein:

the inner cladding portion includes a plurality of air bubbles, and in the inner cladding portion, in cross-sectional surface orthogonal to axial direction of the optical amplifying fiber, two or more layers having low density of air bubbles are present or two or more layers having high density of air bubbles are present.

16. An optical fiber amplifier comprising:

the optical amplifying fiber according to claim 15;

a pumping light source configured to output pumping light for causing optical excitation of the rare-earth element present in the optical amplifying fiber; and an optical coupler configured to cause optical coupling of the pumping light with the inner cladding portion.

17. The optical fiber amplifier according to claim 16, further comprising a plurality of core portions as the at least one single core portion, wherein difference of gains among the plurality of core portions is equal to or smaller than 3 dB.

18. An optical communication system comprising the optical fiber amplifier according to claim 1.

19. An optical amplifying fiber comprising:

at least one single core portion doped with a rare-earth element;

an inner cladding portion configured to enclose the at least one core portion, the inner cladding portion having a lower refractive index than maximum refractive index of each core portion; and an outer cladding portion configured to enclose the inner cladding portion, the outer cladding portion having a lower refractive index than refractive index of the inner cladding portion, wherein:

the inner cladding portion includes a plurality of air bubbles, and when a hexagonal close-packed lattice is defined in cross-sectional surface perpendicular to axial direction of the optical amplifying fiber, regions of the air bubbles are positioned at lattice points.

* * * * *